(12) United States Patent
Kosaka (10) Patent No.: US 8,895,879 B2
(45) Date of Patent: Nov. 25, 2014

(54) IN-VEHICLE LEVER SWITCH DEVICE

(71) Applicant: Bayerische Motoren Werke Aktiengesellschaft, Munich (DE)

(72) Inventor: Ken Kosaka, Miyagi-Ken (JP)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 102 days.

(21) Appl. No.: 13/765,162

(22) Filed: Feb. 12, 2013

(65) Prior Publication Data

US 2013/0206564 A1    Aug. 15, 2013

(30) Foreign Application Priority Data

Feb. 15, 2012    (JP) ................................. 2012-030922

(51) Int. Cl.
*H01H 9/26* (2006.01)
*H01H 19/14* (2006.01)
*B60Q 1/14* (2006.01)

(52) U.S. Cl.
CPC ............. *H01H 19/14* (2013.01); *B60Q 1/1476* (2013.01)
USPC ........................................................ 200/5 A

(58) Field of Classification Search
USPC ......... 200/5 A, 4, 17 R, 11 D, 14, 18, 11 DA, 200/243, 281, 545, 548, 550, 551, 553, 559, 200/329, 330
See application file for complete search history.

(56) References Cited

U.S. PATENT DOCUMENTS

| | | | |
|---|---|---|---|
| 6,080,942 A * | 6/2000 | Sasaki ......................... 200/17 R |
| 8,400,333 B2 * | 3/2013 | Ishikawa et al. ................ 341/35 |
| 2011/0308927 A1* | 12/2011 | Yang et al. ..................... 200/5 A |

FOREIGN PATENT DOCUMENTS

JP    2003-092046    3/2003

* cited by examiner

*Primary Examiner* — Edwin A. Leon
(74) *Attorney, Agent, or Firm* — Crowell & Moring LLP (57) ABSTRACT

In a lever switch device, a holder is assembled in and fixed to a cylindrical lever body formed by combining halved lever bodies and the holder supports two rotating knobs so as to allow the rotating knobs to rotate. Further, a circuit board is mounted on the holder, and both main surfaces of the circuit board face the rotating knobs, respectively. The rotating knob is exposed to the outside at the end of the cylindrical lever body in the axial direction, and the rotating knob is exposed to the outside through window portions formed at the cylindrical lever body. Sliders are mounted on the rotating knobs, respectively, one slider can come into contact with and be separated from contact patterns formed on the main surface, and the other slider can come into contact with and be separated from contact patterns formed on the main surface.

4 Claims, 10 Drawing Sheets

IN-VEHICLE LEVER SWITCH DEVICE

CLAIM OF PRIORITY

This application claims benefit of Japanese Patent Application No. 2012-030922 filed on Feb. 15, 2012, which is hereby incorporated by reference in its entirety.

BACKGROUND

1. Field of the Disclosure

The present disclosure relates to an in-vehicle lever switch device that is used as a turn signal switch, a wiper switch, or the like of an automobile, and more particularly, to an in-vehicle lever switch device that includes two rotating knobs near an end of a cylindrical lever body capable of swinging.

2. Description of the Related Art

In this kind of in-vehicle lever switch device, a cylindrical lever body protrudes from a housing fixed to a steering column or the like, the cylindrical lever body can swing in two operating planes substantially orthogonal to each other, and two rotating knobs, which are exposed to the outside near the end of the cylindrical lever body, can be rotated independently. Further, it is possible to turn on, for example, a turn signal switch or a wiper switch by swinging the cylindrical lever body, and to turn on, for example, a switch for a fog lamp or a switch for a rear wiper by rotating each of the rotating knobs along a plane orthogonal to the axial direction of the cylindrical lever body. If two rotating knobs are disposed near the end of the cylindrical lever body as described above, it is easy to accurately perform various kinds of input operations. Accordingly, it is easy to provide the lever switch device with multiple functions.

Meanwhile, the in-vehicle lever switch device, which includes two rotating knobs near the end of the cylindrical lever body, needs to be provided with rotation detecting mechanisms such as rotary switch mechanisms at two portions in order to detect the rotation of each of the rotating knobs. Since a circuit board is essential to such a rotation detecting mechanism, for example, it is considered that two circuit boards, corresponding to two rotating knobs, are used or inner and outer peripheral portions of one large circuit board are used as rotation detecting regions for the two rotating knobs, respectively. However, when two circuit boards or one large circuit board is assembled in the interior space of the cylindrical lever body or the like of the lever switch device as described above, there is a drawback in that there is an overall increase in the size of the device.

Accordingly, in the past, there has been proposed an in-vehicle lever switch device where contact patterns are formed on one main surface (for example, front surface) and the other main surface (for example, back surface) of one circuit board and two movable contacts, which individually rotate while interlocking with the two rotating knobs, can individually slide on one main surface and the other main surface of the circuit board (for example, see Japanese Unexamined Patent Application Publication No. 2003-92046).

In this related art, a cylindrical lever body is integrated with a shaft portion member extending in an axial direction, and a guide cylinder portion protruding from the shaft portion member passes through the cylindrical lever body and is loosely inserted into center holes of first and second rotating knobs. Further, a circuit board and an annular support member are fixed to the outer peripheral portion of a guide cylinder portion. The circuit board of them is disposed in the cylindrical lever body, and the annular support member is disposed between the first and second rotating knobs (at a position interposed between two rotating knobs) at the end of the cylindrical lever body in the axial direction. The annular support member supports the first rotating knob, which is positioned relatively closer to the end, so as to allow the first rotating knob to rotate, and supports the second rotating knob, which is positioned relatively closer to the base end, so as to allow the second rotating knob to rotate. Further, a shaft integrated with the first rotating knob is loosely inserted into the guide cylinder portion, and protrudes toward the base end in the axial direction. A contact holding plate is fixed to the protruding end portion of the shaft that faces the opening of the shaft portion member. A first movable contact, which comes into elastic contact with one main surface of the circuit board, is mounted on the contact holding plate. Accordingly, when the first rotating knob is rotated, the first movable contact comes into contact with and is separated from contact patterns provided on one main surface of the circuit board, so that the rotation direction and the rotation angle can be detected. Furthermore, a second movable contact, which comes into elastic contact with the other main surface of the circuit board, is mounted on the second rotating knob. Accordingly, when the second rotating knob is rotated, the second movable contact comes into contact with and is separated from contact patterns provided on the other main surface of the circuit board, so that the rotation direction and the rotation angle can be detected.

In the related art disclosed in Japanese Unexamined Patent Application Publication No. 2003-92046, in appearance, the second rotating knob, the annular support member, and the first rotating knob are sequentially disposed side by side at the end portion of the cylindrical lever body and the cylindrical lever body and the annular support member are stationary members that cannot be rotated. Accordingly, a user can accurately rotate each of the rotating knobs. However, since contact patterns for two rotating knobs are separately provided on one main surface and the other main surface of the circuit board that is disposed in the cylindrical lever body, a shaft, which passes through the circuit board, is formed so as to protrude from on one rotating knob (first rotating knob) and a contact holding plate including a movable contact needs to be mounted on the protruding end portion of the shaft. For this reason, since the structure in this related art becomes complicated, there is a problem in that the number of components is increased and assemblability deteriorates. As a result, it has been difficult to reduce costs.

SUMMARY

An in-vehicle lever switch device includes a cylindrical lever body, a first rotating knob and a second rotating knob, and a circuit board. The first rotating knob and a second rotating knob are supported so as to be rotatable along an plane orthogonal to an axial direction of the cylindrical lever body, and the circuit board is assembled in the cylindrical lever body so as to be oriented along the orthogonal plane. A first rotation detection portion, which is used to detect the rotation of the first rotating knob, is provided on one main surface of the circuit board. A second rotation detection portion, which is used to detect the rotation of the second rotating knob, is provided on the other main surface of the circuit board. The cylindrical lever body comprise a combined pair of halved lever bodies. The first and second rotating knobs are rotatably supported by a holder that is assembled in and fixed to the cylindrical lever body. The circuit board is mounted on the holder between the first and second rotating knobs. The first rotating knob is exposed to the outside at an end of the cylindrical lever body in the axial direction. The second rotating knob is exposed to the outside through window portions formed at the cylindrical lever body.

Since both the first and second rotating knobs are rotatably supported by one holder that is assembled in the cylindrical lever body as described above and the circuit board mounted on the holder is disposed between both rotating knobs, it is possible to make one main surface of the circuit board face the first rotating knob and to make the other main surface face the second rotating knob and it is also easy to receive the second rotating knob in the cylindrical lever body and to expose the second rotating knob to the outside through the window portions. For this reason, the rotation of two rotating knobs, which are disposed near the end of the cylindrical lever body, can be detected on both the main surfaces of one circuit board, so that it is possible to easily avoid the increase of the size of the circuit board, the complication of the structure, the increase of the number of components, and the like. Further, since the pair of lever bodies are combined while the holder is assembled, it is possible to assemble a cylindrical lever body with a holder and to dispose the first and second rotating knobs at predetermined positions. Accordingly, good assemblability may be expected.

DESCRIPTION OF THE EXEMPLARY EMBODIMENTS

Figure 1:
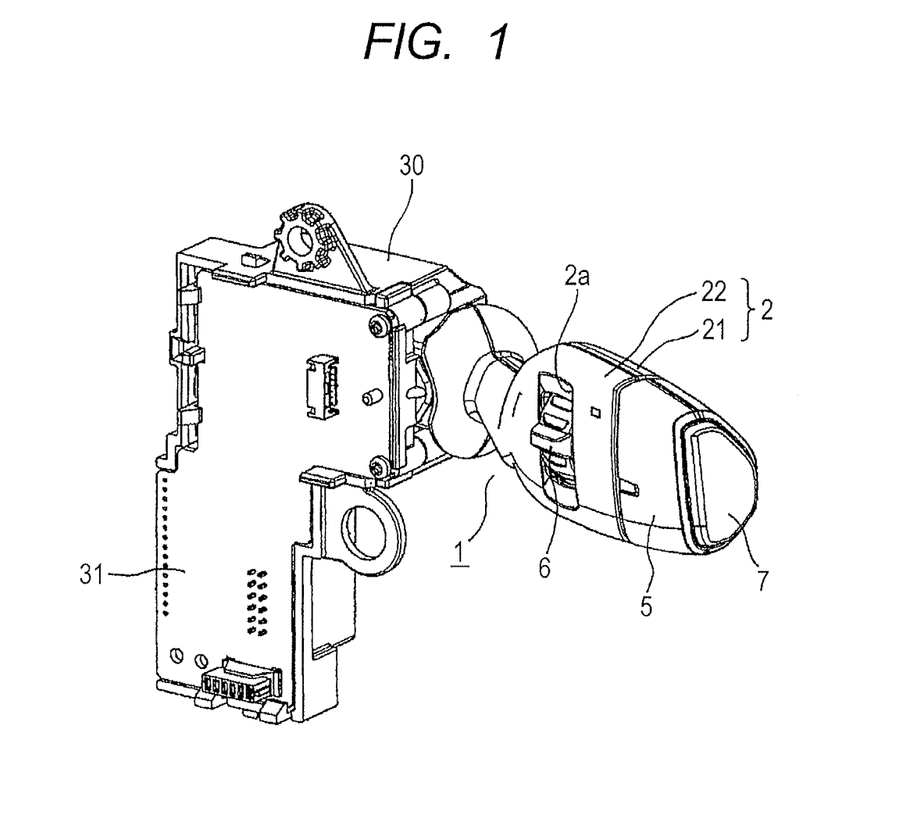
FIG. 1 is a perspective view showing a state where an in-vehicle lever switch device according to an embodiment of the invention is mounted.
Figure 2:
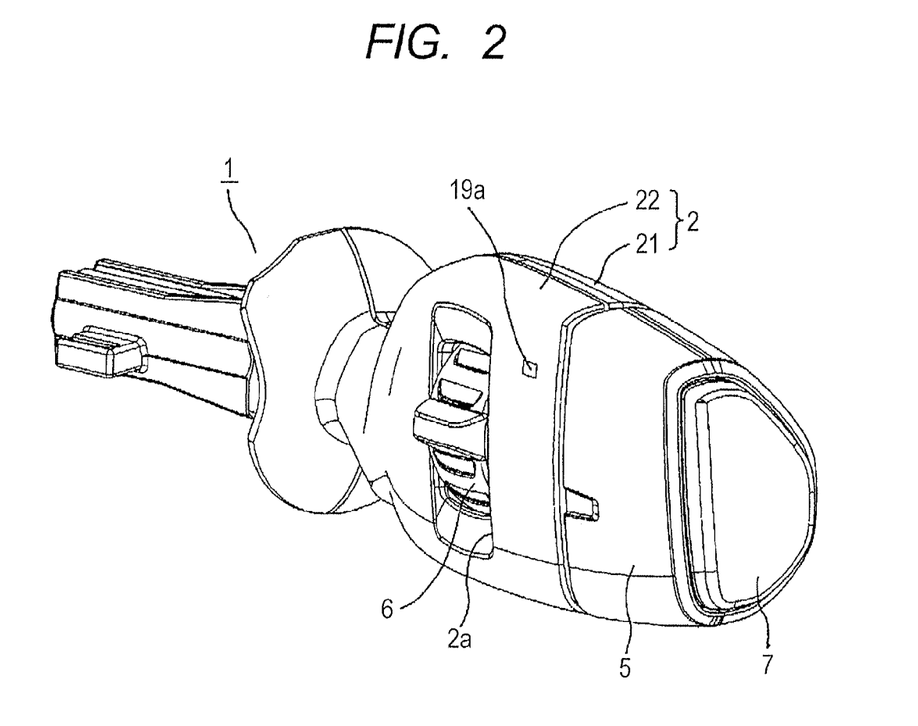
FIG. 2 is a perspective view showing the appearance of the lever switch device.
Figure 3:
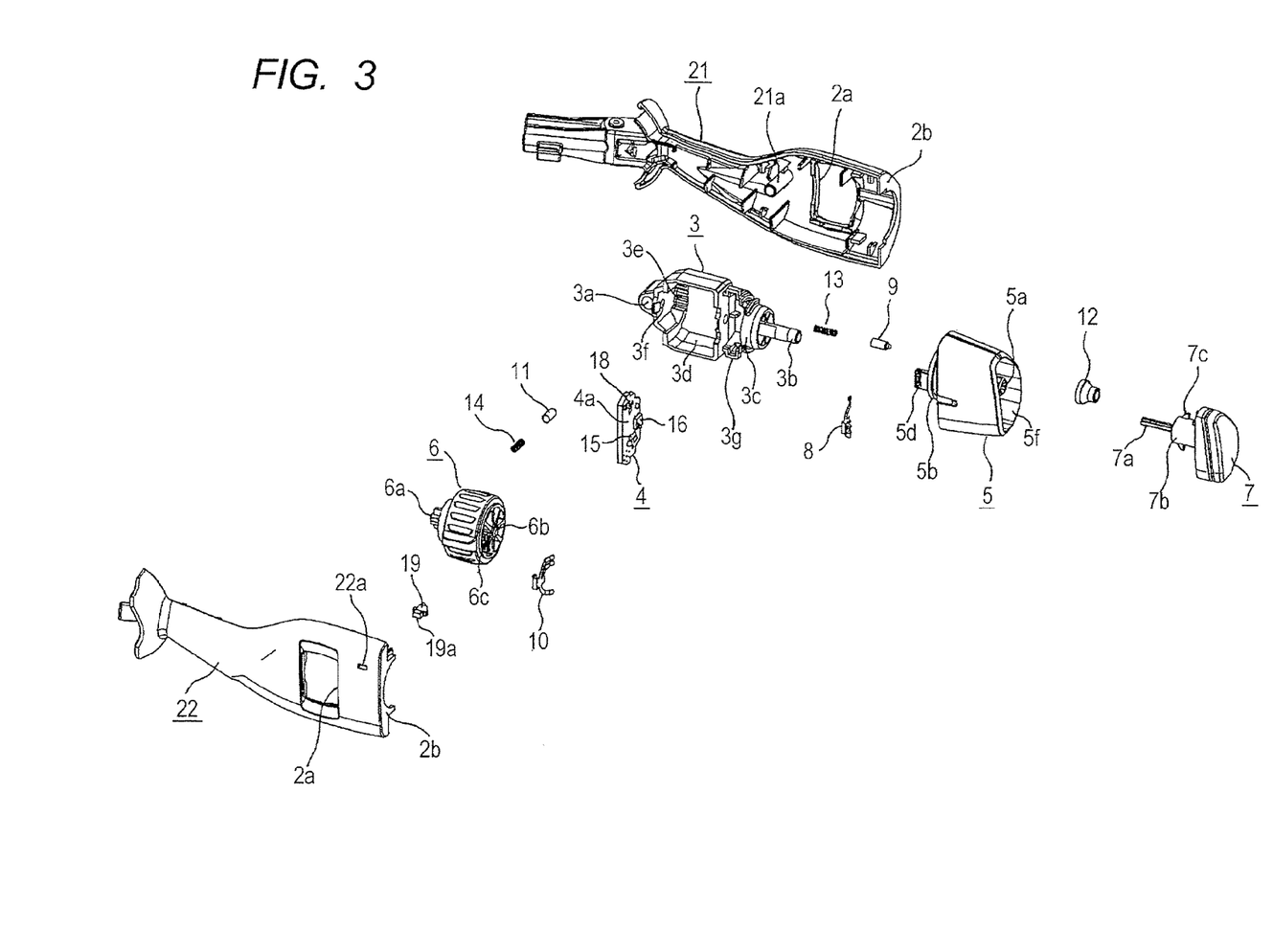
FIG. 3 is an exploded perspective view of the lever switch device.
Figure 4:
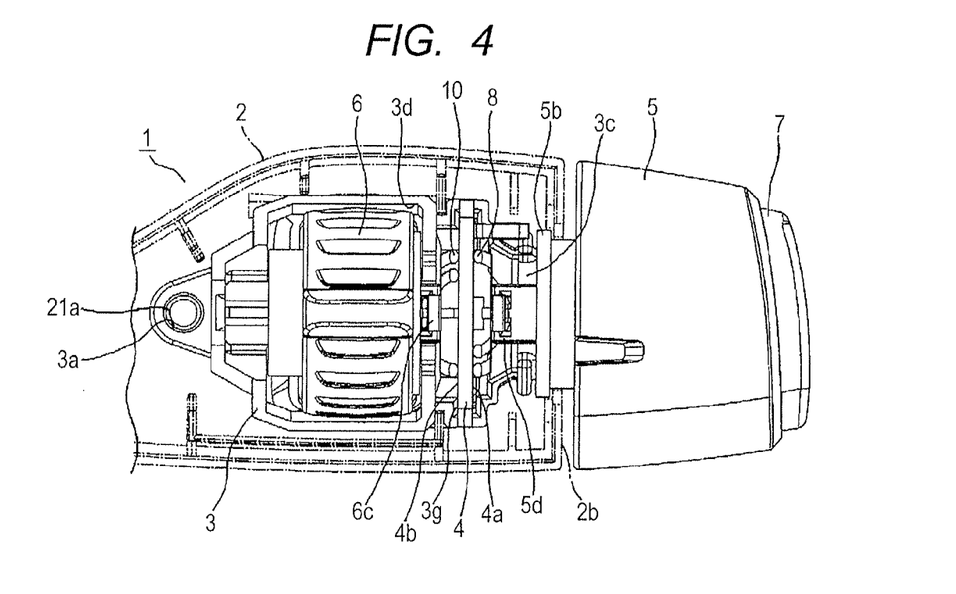
FIG. 4 is a front view of the lever switch device of which a part is omitted.

Embodiments of the invention will be described below with reference to the drawings. As shown in FIG. 1, an in-vehicle lever switch device 1 according to this embodiment is designed as a lever switch device protruding from a housing 30, which is fixed to a steering column or the like, to the right side. However, the in-vehicle lever switch device 1 may protrude from the housing 30 to the left side. Further, a main board 31 is fixed to the housing 30, and a circuit component or a connector mounted on the main board 31 is electrically connected to the lever switch device 1.

As shown in FIGS. 1 to 8, the in-vehicle lever switch device 1 according to this embodiment includes a cylindrical lever body 2 that is formed by combining a pair of halved lever bodies 21 and 22, a holder 3 that is assembled in and fixed to the cylindrical lever body 2, a circuit board 4 that is mounted on the holder 3, first and second rotating knobs 5 and 6 that are rotatably supported by the holder 3, a pressing knob 7 that is supported by the first rotating knob 5 so as to be capable of reciprocating, a slider 8 and an engagement/disengagement member 9 for the first rotating knob 5, a slider 10 and an engagement/disengagement member 11 for the second rotating knob 6, and a rubber body 12 for the pressing knob 7.

The cylindrical lever body 2 can swing in two operating planes that are substantially orthogonal to each other. In terms of improvement in design, the appearances of the cylindrical lever body 2, the first rotating knob 5, and the pressing knob 7 are formed so that the cross-sections thereof taken along an orthogonal plane orthogonal to the axial direction have a non-circular shape, that is, a rounded trapezoid shape. For this reason, the appearance of the first rotating knob 5 does not have a point-symmetrical shape with respect to the center line of rotation. However, since only a part of the outer surface of the second rotating knob 6 is exposed to the outside through window portions 2a formed at the cylindrical lever body 2, the appearance of the second rotating knob 6 substantially has a point-symmetrical shape with respect to the center line of rotation. The window portions 2a are formed at the end portions of the pair of halved lever bodies 21 and 22, which are components of the cylindrical lever body 2, respectively. A mounting boss 21a, which is used to position and hold the holder 3, protrudes from the inner wall of one lever body 21. Further, a fitting hole 22a, which is used to mount a light guide body 19 (see FIG. 9), is formed at the other lever body 22, and the end face of the light guide body 19 exposed to the fitting hole 22a forms an illumination portion 19a that can illuminate by a light source 18 to be described below.

The holder 3 is assembled in the interior space of the end portion of the cylindrical lever body 2. Specifically, the mounting boss 21a formed in the lever body 21 is inserted into a mounting hole 3a of the holder 3, the holder 3 is assembled so as to be positioned on the inner wall of the lever body 21, and the pair of lever bodies 21 and 22 are then fitted to each other by snap-fitting or the like, so that the cylindrical lever body 2 with the holder 3 is assembled.

The holder 3 is provided with an elongated cylindrical guide shaft part 3b that protrudes from an end face 2b of the cylindrical lever body 2 and is inserted into the first rotating knob 5, a guide wall part 3c that is disposed near the end face 2b in the cylindrical lever body 2 and includes a cylindrical surface, a knob receiving portion 3d in which the second rotating knob 6 is received, a cam surface 3e that includes concave and convex portions continuing on a part of the inner wall surface facing the knob receiving portion 3d, a pair of bearing portions 3f into which shaft portions 6a and 6b of the second rotating knob 6 are inserted, a board mounting portion 3g into which the circuit board 4 is press-fitted, and a first receiving portion 3h (see FIG. 8) in which a coil spring 13 and the engagement/disengagement member 9 for the first rotating knob 5 are received. The center line of the elongated cylindrical surface of the guide shaft part 3b corresponds to the center line of the cylindrical surface of the guide wall part 3c and the center line of a shaft hole of each of the bearing portions 3f, and a drive rod 7a of the pressing knob 7 is inserted into the guide shaft part 3b.

Figure 5:
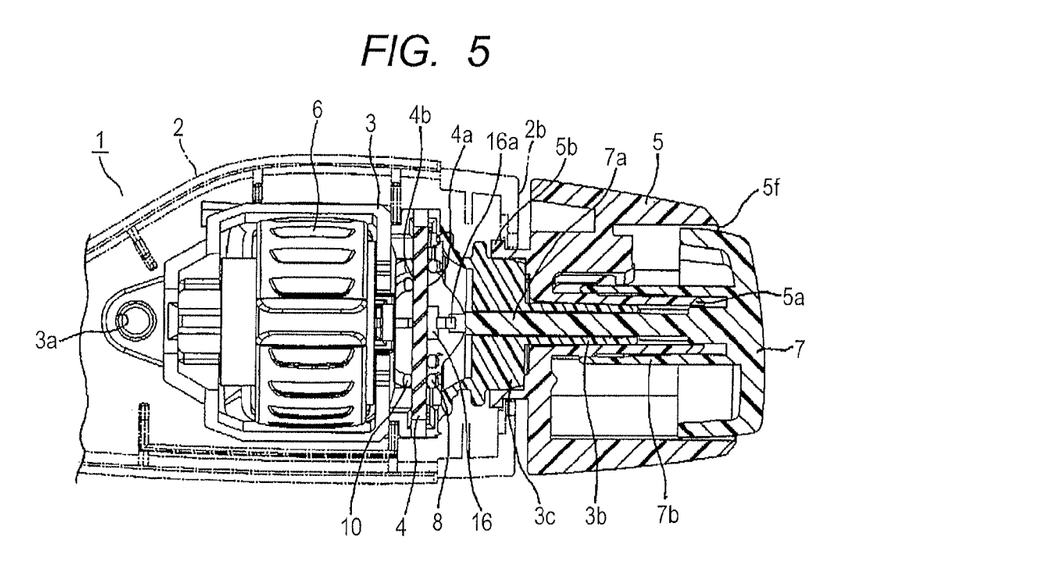
FIG. 5 is a partial cross-sectional view corresponding to FIG. 4.
Figure 6:
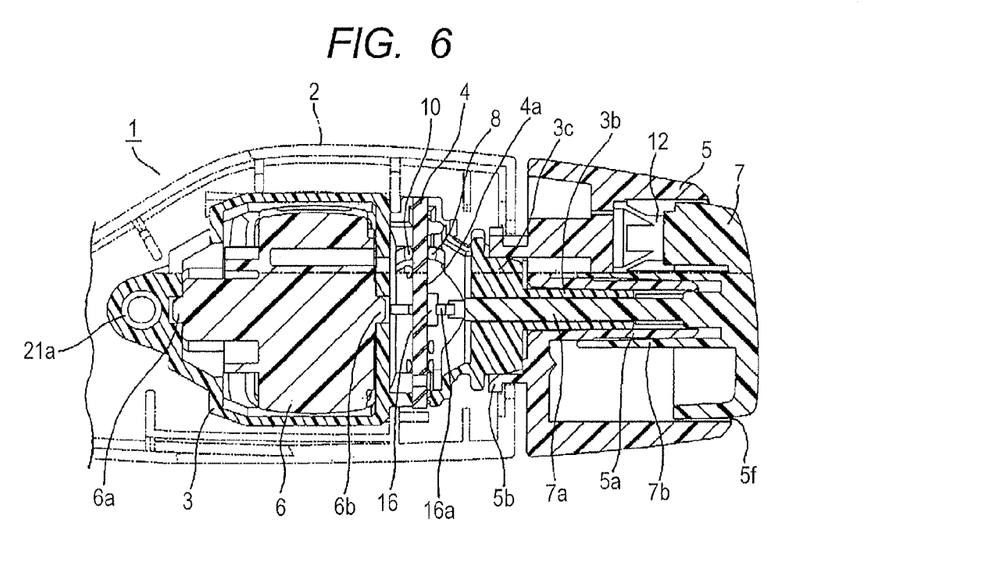
FIG. 6 is a longitudinal cross-sectional view of the lever switch device.
Figure 7:
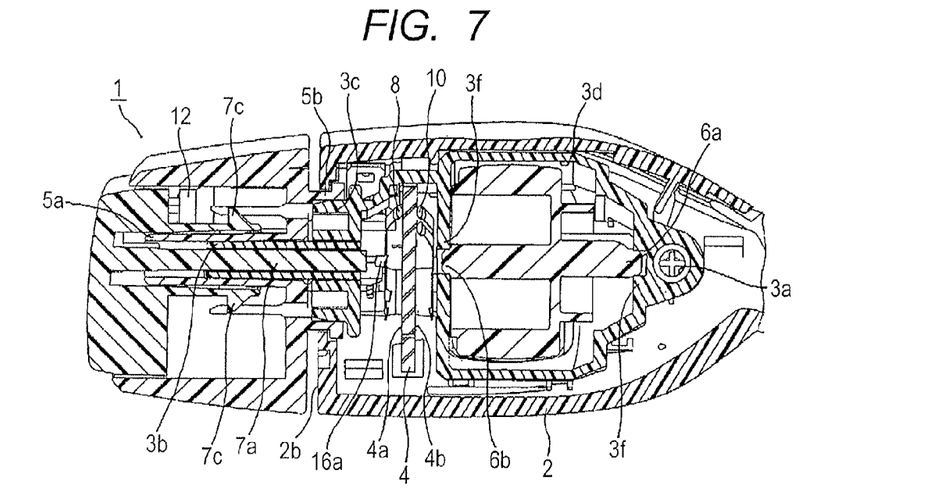
FIG. 7 is a longitudinal cross-sectional view of the lever switch device taken at a position different from FIG. 6 when seen from the rear side of FIG. 6.
Figure 8:
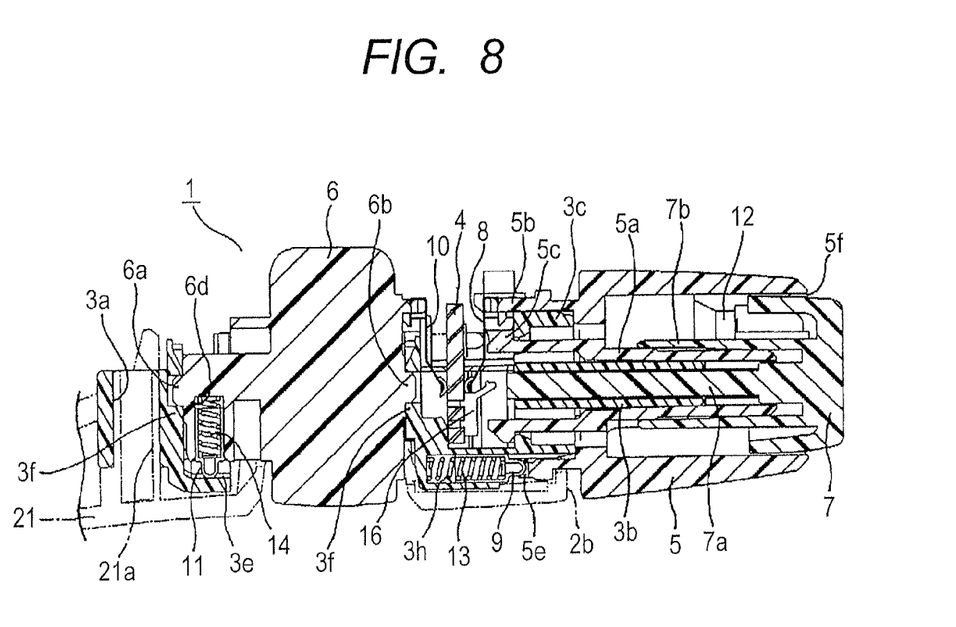
FIG. 8 is a transverse cross-sectional view of the lever switch device of which a part is omitted.

The first rotating knob 5 is provided with an inner engagement portion 5a (see FIG. 5) that is slidably inserted around the guide shaft part 3b, an outer engagement portion 5b that is inserted into the cylindrical lever body 2 and is slidably inserted around the guide wall part 3c, a retaining hook 5c (see FIG. 8) that can be caught by the end face of the base end portion of the guide wall part 3c, a slider mounting portion 5d (see FIG. 4) on which the slider 8 as a movable contact is mounted, a cam surface 5e (see FIG. 8) that includes concave and convex portions continuing on a part of the end face of the base end portion of the outer engagement portion 5b, and an open end 5f to which the pressing knob 7 is loosely fitted. As shown in FIG. 5, the first rotating knob 5 is rotatably supported by the guide shaft part 3b and the guide wall part 3c of the holder 3. When the first rotating knob 5 is mounted on the holder 3, a straight line passing through the centers of the inner engagement portion 5a and the outer engagement portion 5b becomes the center line of rotation and the engagement/disengagement member 9 energized by the coil spring 13 comes into elastic contact with the cam surface 5e as shown in FIG. 8. Further, the inner engagement portion 5a of the first rotating knob 5 supports the cylindrical body portion 7b of the pressing knob 7 so that the cylindrical body portion 7b can reciprocate along the center line of rotation. Furthermore, when the holder 3 is assembled in the cylindrical lever body 2, the first rotating knob 5 is disposed near the end face 2b of the cylindrical lever body 2 and the first rotating knob 5, which is exposed to the outside at an end of the cylindrical lever body 2 in the axial direction, can be rotated along the orthogonal plane orthogonal to the axial direction.

The second rotating knob 6 is provided with shaft portions 6a and 6b that are pivotally supported by the pair of bearing portions 3f of the holder 3, a slider mounting portion 6c on which the slider 10 as a movable contact is mounted, and a second receiving portion 6d (see FIG. 8) in which the engagement/disengagement member 11 and a coil spring 14 are received. Since the second rotating knob 6 is received in the knob receiving portion 3d of the holder 3 and rotatably supported by the pair of bearing portions 3f, a straight line passing through the centers of the shaft portions 6a and 6b becomes the center line of rotation. When the second rotating knob 6 is mounted on the holder 3, the shaft portions 6a and 6b are disposed on the extension of the guide shaft part 3b and the engagement/disengagement member 11 energized by the coil spring 14 comes into elastic contact with the cam surface 3e of the holder 3. Further, when the holder 3 is assembled in the cylindrical lever body 2, the second rotating knob 6 is disposed at the end portion of the cylindrical lever body 2 in the cylindrical lever body 2 and the second rotating knob 6 exposed to the outside through the window portions 2a of the cylindrical lever body 2 can be rotated along the orthogonal plane orthogonal to the axial direction.

The pressing knob 7 is provided with a drive rod 7a that passes through the inner engagement portion 5a of the first rotating knob 5 and the guide shaft part 3b of the holder 3 and extends toward the base end of the first rotating knob 5 in the axial direction, a cylindrical body portion 7b that is slidably inserted around the inner engagement portion 5a, and regulation hooks 7c that protrude from the outer peripheral surface of the cylindrical body portion 7b toward the outside in the radial direction. The pressing knob 7 is mounted on the first rotating knob 5 so as to be loosely fitted to the open end 5f, so that the drive rod 7a extends so as to overlap the center line of rotation of the first rotating knob 5. Further, when the first rotating knob 5 is mounted on the holder 3, the end portion of the drive rod 7a is disposed at a position where the end portion of the drive rod 7a can press a driven portion 16a of a push switch 16 mounted on the circuit board 4 (see FIG. 6). Furthermore, the cylindrical body portion 7b can reciprocate relative to the outer peripheral surface of the inner engagement portion 5a in the direction along the center line of rotation of the first rotating knob 5. However, the regulation hooks 7c are engaged with the inner wall portion of the first rotating knob 5, so that the rotation and separation of the cylindrical body portion 7b are prevented (see FIG. 7). That is, the pressing knob 7 is mounted in a retaining state where the pressing knob 7 can reciprocate relative to the first rotating knob 5 and can be rotated integrally with the first rotating knob 5. Moreover, when the holder 3 is assembled in the cylindrical lever body 2, the pressing knob 7 exposed to the open end 5f of the first rotating knob 5 can be pressed toward the base end of the first rotating knob 5 in the axial direction and the pressing knob 7 is also rotated integrally with the rotating knob 5 when the first rotating knob 5 is rotated.

Figure 9:
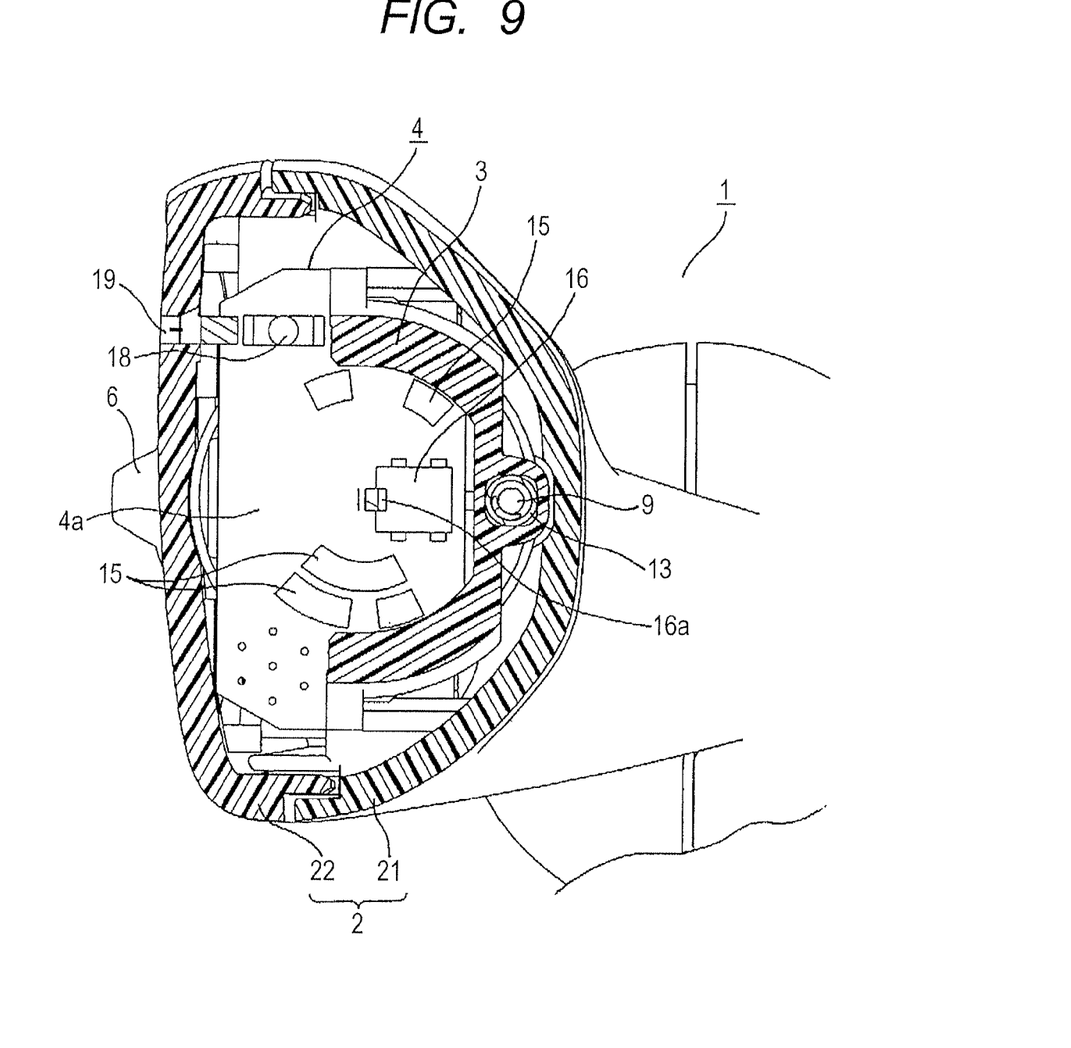
FIG. 9 is a view showing one main surface of a circuit board that is mounted on a holder of the lever switch device.
Figure 12:
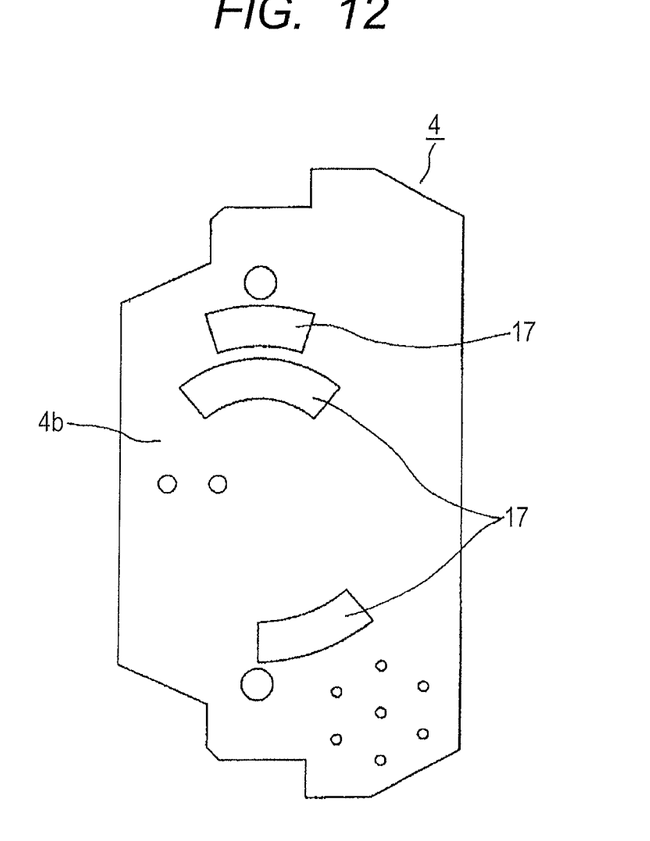
FIG. 12 is a view showing the other main surface of the circuit board.

The circuit board 4 is mounted by being press-fitted into the board mounting portion 3g of the holder 3. Accordingly, when the holder 3 is assembled in the cylindrical lever body 2, both main surfaces 4a and 4b of the circuit board 4 are disposed along the orthogonal plane orthogonal to the axial direction of the cylindrical lever body 2. That is, the circuit board 4 is fixed to the holder 3 and the cylindrical lever body 2 at an orientation where one main surface 4a faces the end of the cylindrical lever body 2 in the axial direction and the other main surface 4b faces the base end in the axial direction. As shown in FIG. 9, first contact patterns 15 as a rotation detection portion for the first rotating knob 5 (first rotation detection portion) are formed on one main surface 4a of the circuit board 4 and the push switch 16 as a pressing detection part for the pressing knob 7 is mounted on one main surface 4a. The push switch 16 includes the driven portion 16a called a stem or the like, and is a known push switch that is turned on when the driven portion 16a is pressed by a predetermined stroke. Further, as shown in FIG. 12, second contact patterns 17 as a rotation detection portion for the second rotating knob 6 (second rotation detection portion) are formed on the other main surface 4b of the circuit board 4. Meanwhile, a light source 18 such an LED is mounted on the main surface 4a of the circuit board 4, and light of the light source 18 enters the light guide body 19, so that the illumination portion 19a illuminates.

Figure 11:
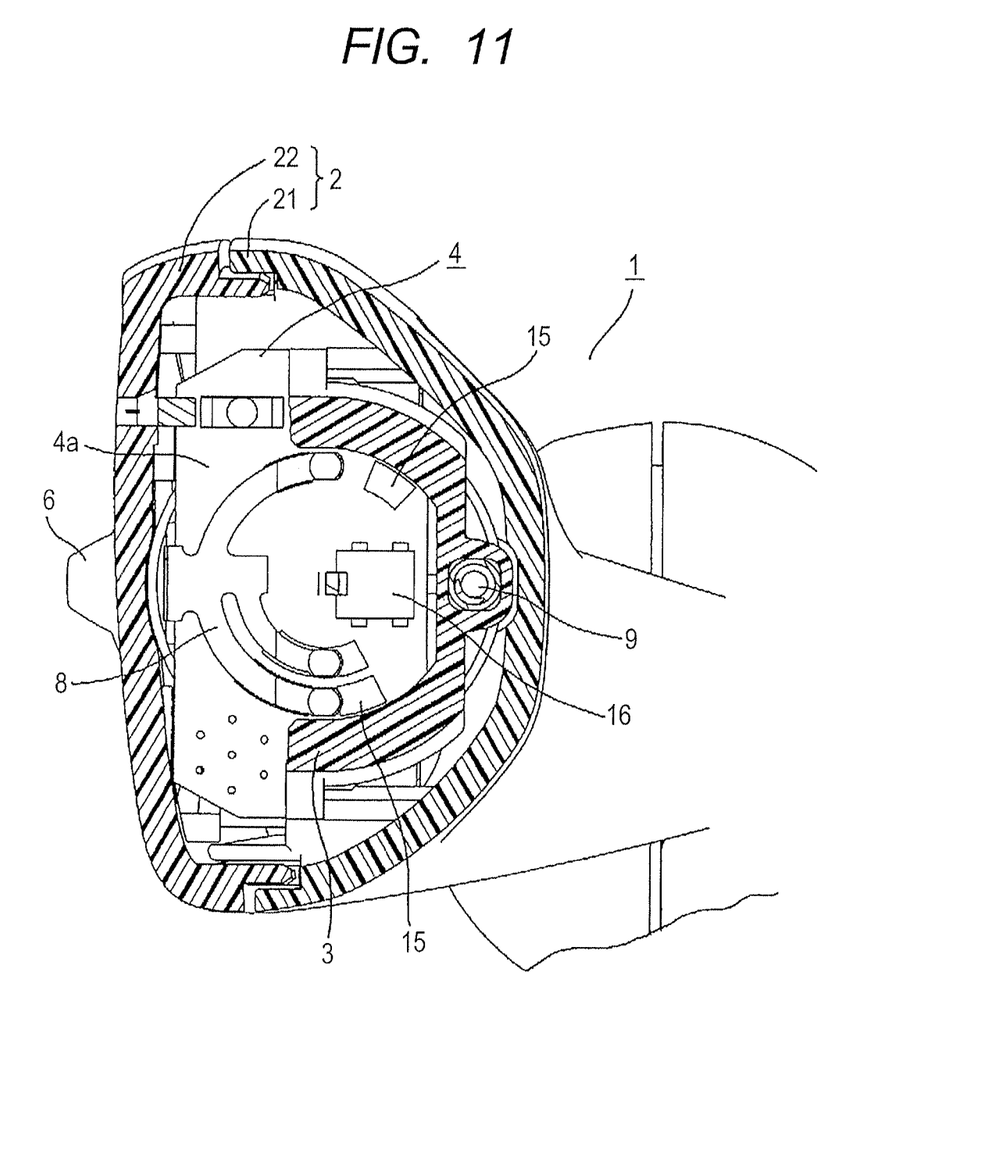
FIG. 11 is a view showing that a movable contact mounted on the first rotating knob is added to FIG. 9.

As shown in FIG. 11, the slider 8 mounted on the slider mounting portion 5d of the first rotating knob 5 slidably comes into elastic contact with the main surface 4a of the circuit board 4. Accordingly, when the first rotating knob 5 is rotated, the slider 8 comes into contact with and is separated from the first contact patterns 15. Likewise, the slider 10 mounted on the slider mounting portion 6c of the second rotating knob 6 slidably comes into elastic contact with the other main surface 4b (see FIG. 12) of the circuit board 4. Accordingly, when the second rotating knob 6 is rotated, the slider 10 comes into contact with and is separated from the second contact patterns 17. Further, as described above, the end portion of the drive rod 7a of the pressing knob 7 is disposed at the position facing the driven portion 16a of the push switch 16. Accordingly, when the pressing knob 7 is pressed, the drive rod 7a presses the driven portion 16a so that the push switch 16 is turned on. Here, the driven portion 16a and the push switch 16 forms the pressing detection part.

The rubber body 12 is a dome-shaped elastic molding. The rubber body 12 is assembled at a position facing the open end 5f in the first rotating knob 5, and elastically energizes the pressing knob 7 in the direction opposite to the pressing direction (see FIG. 6). For this reason, the pressing knob 7 is pressed while elastically deforming the rubber body 12, and it is possible to make the pressing knob 7, which has been pressed, automatically return to an original position by the elastic restoring force of the rubber body 12. Further, when the pressing knob 7 is pressed, the rubber body 12 is elastically buckled at an appropriate timing, so that a click feeling is generated. The push switch 16 is designed so as to be turned on immediately after a click feeling is generated.

Next, the operation of the in-vehicle lever switch device 1 having the above-mentioned structure will be described. Meanwhile, a user can selectively turn on, for example, a wiper switch, a turn signal switch, or the like by swinging the cylindrical lever body 2. However, since the operating mechanism in the swing of the cylindrical lever body 2 is not directly related to the invention, the description thereof will be omitted.

Figure 10:
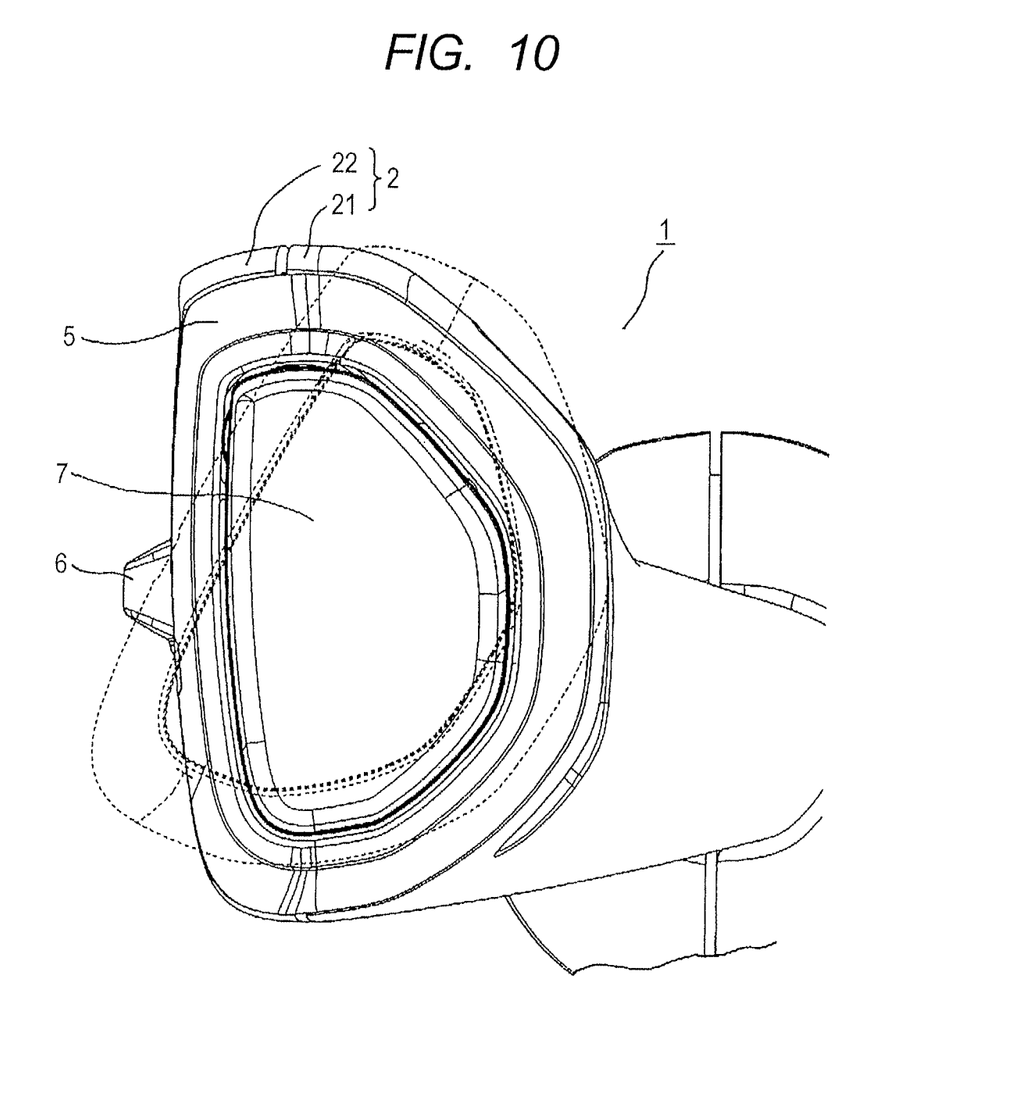
FIG. 10 is a view showing a first rotating knob and a pressing knob that are provided at the end portion of the lever switch device.

First, an operation, when a user rotates the first rotating knob 5, will be described. Since the inner and outer engagement portions 5a and 5b of the first rotating knob 5 are rotatably supported by the guide shaft part 3b and the guide wall part 3c of the holder 3, respectively, the orientation of the first rotating knob 5, which is exposed to the outside at the end of the cylindrical lever body 2 in the axial direction, is stabilized. Accordingly, there is not concern that the center line of rotation of the first rotating knob 5 is inclined with respect to the axial direction of the cylindrical lever body 2. Therefore, a user can rotate the first rotating knob 5 along the orthogonal plane, which is orthogonal to the axial direction of the cylindrical lever body 2, in the normal and reverse directions. At this time, the pressing knob 7 is also rotated together with the first rotating knob 5 as shown by a broken line of FIG. 10. The slider 8 mounted on the first rotating knob 5 comes into elastic contact with the main surface 4a of the circuit board 4, and the first contact patterns 15 shown in FIG. 9 are formed on the main surface 4a. FIG. 11 shows a positional relationship between the slider 8 and the first contact patterns 15 when the first rotating knob 5 is at an OFF position. Since the contact position of the slider 8 relative to the first contact patterns 15 changes with rotation of the first rotating knob 5, it is possible to output a plurality of operation signals corresponding to the rotational positions of the slider 8. Further, when the first rotating knob 5 including the cam surface 5e is rotated, the engagement/disengagement member 9 held by the holder 3 is engaged with and disengaged from the concave and convex portions of the cam surface 5e. Accordingly, a click feeling is generated at the time of the engagement and disengagement, and it is possible to position and hold the first rotating knob 5 at each rotational position of the slider 8. For this reason, a user can accurately rotate the first rotating knob 5 to set the first rotating knob 5 to an intended rotational position.

Meanwhile, when the first rotating knob 5 is rotated from the OFF position, the light source 18 is turned on and the illumination portion 19a of the light guide body 19 illuminates. When the first rotating knob 5 returns to the OFF position, the light source 18 is turned off. Further, the on/off switching of a rear wiper or the selection of operational speed of the rear wiper has been performed by the rotation of the first rotating knob 5 in this embodiment, but the use of the first rotating knob 5 is not limited thereto.

Next, an operation, when a user rotates the second rotating knob 6, will be described. Since the shaft portions 6a and 6b of the second rotating knob 6 are rotatably supported by the pair of bearing portions 3f of the holder 3, a user can rotate the second rotating knob 6, which is exposed to the outside through the window portions 2a of the cylindrical lever body 2, along the orthogonal plane, which is orthogonal to the axial direction, in the normal and reverse directions. The slider 10 mounted on the second rotating knob 6 comes into elastic contact with the main surface 4b of the circuit board 4, and the second contact patterns 17 shown in FIG. 12 are formed on the main surface 4b of the circuit board 4. Since the contact position of the slider 10 relative to the second contact patterns 17 changes with rotation of the second rotating knob 6, it is possible to output a plurality of operation signals corresponding to the rotational positions of the slider 10. Further, when the second rotating knob 6 holding the engagement/disengagement member 11 is rotated, the engagement/disengagement member 11 is engaged with and disengaged from the concave and convex portions of the cam surface 3e of the holder 3. Accordingly, a click feeling is generated at the time of the engagement and disengagement, and it is possible to position and hold the second rotating knob 6 at each rotational position of the slider 10. For this reason, a user can accurately rotate the second rotating knob 6 to set the second rotating knob 6 to an intended rotational position. Meanwhile, the sensitivity of a rain sensor has been controlled by the rotation of the second rotating knob 6 in this embodiment, but the use of the second rotating knob 6 is not limited thereto.

Next, an operation, when a user presses the pressing knob 7, will be described. Since the cylindrical body portion 7b of the pressing knob 7 is supported by the inner engagement portion 5a of the first rotating knob 5 so as to be capable of reciprocating, a user can press the pressing knob 7, which is exposed to the open end 5f of the first rotating knob 5, toward the base end of the first rotating knob 5 in the axial direction. The pressing of the pressing knob 7 is performed while the rubber body 12 is elastically deformed, and the driven portion 16a of the push switch 16, which is provided on the main surface 4a of the circuit board 4, is pressed by the end portion of the drive rod 7a with the pressing of the pressing knob 7. Accordingly, when the driven portion 16a is pressed by a predetermined stroke, the rubber body 12 is elastically buckled, so that a click feeling is generated. The push switch 16 is adapted so as to be turned on immediately after a click feeling is generated. Further, when a pressing force applied to the pressing knob 7 is removed, the pressing knob 7 returns to an original position by the elastic restoring force of the rubber body 12. Accordingly, the driven portion 16a automatically returns to the OFF position by a return spring (not shown) that is built in the push switch 16. Meanwhile, a wiper washer of a rear wiper has been operated by the pressing of the pressing knob 7 in this embodiment, but the use of the pressing knob 7 is not limited thereto.

As described above, in the in-vehicle lever switch device 1 according to this embodiment, one holder 3, which is assembled in the cylindrical lever body 2, supports both the first and second rotating knobs 5 and 6 so as to allow the first and second rotating knobs 5 and 6 to rotate and the circuit board 4 mounted on the holder 3 is disposed between both the first and second rotating knobs 5 and 6. Accordingly, it is possible to make one main surface 4a of the circuit board 4 face the first rotating knob 5 and to make the other main surface 4b face the second rotating knob 6, and it is also easy to receive the second rotating knob 6 in the cylindrical lever body 2 and to expose the second rotating knob 6 to the outside through the window portions 2a. Therefore, the rotation of two rotating knobs 5 and 6, which are disposed near the end of the cylindrical lever body 2, can be detected on both the main surfaces 4a and 4b of one circuit board 4, so that it is possible to easily avoid the increase of the size of the circuit board 4, the complication of the structure, the increase of the number of components, and the like.

Further, when the holder 3 on which the first and second rotating knobs 5 and 6 and the circuit board 4 are mounted is interposed between the pair of lever bodies 21 and 22 and both the lever bodies 21 and 22 are combined with each other in the in-vehicle lever switch device 1, it is possible to assemble the cylindrical lever body 2 with the holder 3 and both the rotating knobs 5 and 6, the circuit board 4, and the pressing knob 7 are disposed at predetermined positions. That is, the first rotating knob 5 is disposed at the position facing one main surface 4*a* of the circuit board 4, so that the slider 8 can come into contact with and be separated from the first contact patterns 15. The pressing knob 7 supported by the first rotating knob 5 is also disposed at the position facing the main surface 4*a*, so that the end portion of the drive rod 7*a* is disposed at the position where the end portion of the drive rod 7*a* can press the driven portion 16*a* of the push switch 16. Furthermore, the second rotating knob 6 is disposed at the position facing the other main surface 4*b* of the circuit board 4, so that the slider 10 can come into contact with and be separated from the second contact patterns 17. Accordingly, the assemblability of the lever switch device 1 is good, the number of components of the lever switch device 1 is reduced, and it is easy to reduce the costs of the lever switch device 1.

Meanwhile, the contact patterns 15 and 17, which can come into contact with and be separated from the sliders 8 and 10, have been formed on both the main surfaces 4*a* and 4*b* of the circuit board 4 in this embodiment, so that the rotation (rotation direction and rotation angle) of the first and second rotating knobs 5 and 6 can be detected. Accordingly, the structure of a rotation detecting mechanism is simple and it is also easy to ensure detection accuracy. However, a rotation detecting mechanism using a rotary encoder or the like may be used instead.

Further, the lever switch device where the first rotating knob 5 holds the pressing knob 7 has been described in the embodiment, but the pressing knob 7 may be omitted.

It should be understood by those skilled in the art that various modifications, combinations, sub-combinations and alterations may occur depending on design requirements and other factors insofar as they are within the scope of the appended claims of the equivalents thereof.

What is claimed is:

1. An in-vehicle lever switch device comprising:
   a cylindrical lever body;
   a first rotating knob and a second rotating knob that are supported so as to be rotatable along an plane orthogonal to an axial direction of the cylindrical lever body; and
   a circuit board that is assembled in the cylindrical lever body so as to be oriented along the orthogonal plane,
   wherein a first rotation detection portion, which is used to detect the rotation of the first rotating knob, is provided on one main surface of the circuit board,
   a second rotation detection portion, which is used to detect the rotation of the second rotating knob, is provided on the other main surface of the circuit board,
   the cylindrical lever body comprises a combined pair of halved lever bodies,
   the first and second rotating knobs are rotatably supported by a holder that is assembled in and fixed to the cylindrical lever body,
   the circuit board is mounted on the holder between the first and second rotating knobs,
   the first rotating knob is exposed to the outside at an end of the cylindrical lever body in the axial direction, and
   the second rotating knob is exposed to the outside through window portions formed at the cylindrical lever body.

2. The in-vehicle lever switch device according to claim 1, wherein first contact patterns as the first rotation detection portion are provided on the circuit board,
   second contact patterns as the second rotation detection portion are provided on the circuit board,
   a first movable contact, which is slidable on the first contact patterns, is mounted on the first rotating knob, and
   a second movable contact, which is slidable on the second contact patterns, is mounted on the second rotating knob.

3. The in-vehicle lever switch device according to claim 1, wherein the holder is provided with a guide shaft part that protrudes from an end of the cylindrical lever body in the axial direction and is inserted into the first rotating knob, and a guide wall part that is disposed in the cylindrical lever body, and
   the first rotating knob is provided with an inner engagement portion that is slidably inserted around the guide shaft part, and an outer engagement portion that is inserted into the cylindrical lever body and slidably inserted around the guide wall part.

4. The in-vehicle lever switch device according to claim 1, wherein a first cam surface is formed on one of the holder and the first rotating knob and a first receiving portion, which holds a first engagement/disengagement member coming into elastic contact with the first cam surface, is formed on the other thereof, and
   a second cam surface is formed on one of the holder and the second rotating knob and a second receiving portion, which holds a second engagement/disengagement member coming into elastic contact with the second cam surface, is formed on the other thereof.

\* \* \* \* \*